(12) United States Patent
Libin et al.

(10) Patent No.: US 11,800,060 B1
(45) Date of Patent: Oct. 24, 2023

(54) IMMERSIVE AND REFLECTIVE VIDEO CHAT

(71) Applicant: mmhmm inc., Little Rock, AR (US)

(72) Inventors: Phil Libin, San Francisco, CA (US); Leonid Kitainik, San Jose, CA (US)

(73) Assignee: mmhmm inc., Little Rock, AR (US)

( * ) Notice: Subject to any disclaimer, the term of this patent is extended or adjusted under 35 U.S.C. 154(b) by 0 days.

(21) Appl. No.: 17/724,545

(22) Filed: Apr. 20, 2022

Related U.S. Application Data

(60) Provisional application No. 63/177,750, filed on Apr. 21, 2021.

(51) Int. Cl.
*H04N 7/15* (2006.01)
*G06V 40/16* (2022.01)
*G06V 40/20* (2022.01)

(52) U.S. Cl.
CPC ........... *H04N 7/157* (2013.01); *G06V 40/174* (2022.01); *G06V 40/20* (2022.01)

(58) Field of Classification Search
CPC ........ H04N 7/15; H04N 7/157; G06V 40/174; G06V 40/20
USPC ............................................. 348/14.02–14.9
See application file for complete search history.

(56) References Cited

U.S. PATENT DOCUMENTS

| | | | |
|---|---|---|---|
| 2014/0267550 A1* | 9/2014 | Nimri | H04N 7/152 348/14.09 |
| 2020/0186576 A1* | 6/2020 | Gopal | H04L 65/403 |
| 2021/0406806 A1* | 12/2021 | Sadowski | G06V 20/52 |
| 2022/0174107 A1* | 6/2022 | Han | H04N 5/272 |
| 2022/0277565 A1* | 9/2022 | Haro | G06V 40/174 |
| 2022/0321613 A1* | 10/2022 | Lin | H04L 65/1083 |
| 2022/0335854 A1* | 10/2022 | Gupta | G06T 13/40 |

* cited by examiner

*Primary Examiner* — Maria El-Zoobi
(74) *Attorney, Agent, or Firm* — Muirhead and Saturnelli, LLC

(57) ABSTRACT

Providing a video conference for multiple participants includes choosing between at least one physical conference space and at least one virtual conference space, a first one of the participants inviting a second one of the participants to the video conference, the second one of the participants joining the video conference, and conducting the video conference by showing the participants in a same conference space in real time. The conference space may be a physical location of one of the participants or may be a virtual conference space. The participants may switch between the at least one physical conference space and the at least one virtual conference space during the video conference. The first one of the participants may invite the second one of the participants by sending a link. At least one of the participants may see the first participant and the second participant interacting in the conference space.

22 Claims, 10 Drawing Sheets

IMMERSIVE AND REFLECTIVE VIDEO CHAT

CROSS-REFERENCE TO RELATED APPLICATIONS

This application claims priority to U.S. Prov. App. No. 63/177,750, filed on Apr. 21, 2021, and entitled "IMMERSIVE AND REFLECTIVE VIDEO CHAT", which is incorporated herein by reference.

TECHNICAL FIELD

This application is directed to the fields of visual communications and user interfaces, and more particularly to the field of video chat between participants.

BACKGROUND OF THE INVENTION

With the rise of a remote, geographically dispersed workforce, combined with the challenges and limitations caused by the COVID-19 pandemic, video conferencing has been quickly gaining the position of an important productivity and communications medium, connecting people through their work, personal and family lives, education, entertainment, and other areas. The global video conferencing market size is estimated to reach $22.5 billion by 2026. It has been determined that 78% of corporate businesses are already using video conferencing to facilitate team collaboration, while 58% of companies are using video conferencing very regularly, implementing it as part of their daily operations. According to market research, 30% of organizations worldwide began using web conferencing solutions for the first time due to COVID-19. Not surprisingly, reducing travel has been consistently ranked as the top video conferencing benefit in recent polls.

On an average day, US businesses conduct over 11 million video conferencing meetings with hundreds of millions of daily participants: Zoom alone has over 300 million daily participants of its video meetings; during the quarantine months of 2020, Google Hangout Meets had over 100 million daily participants, while Microsoft Teams had almost 75 million active daily users in 2020.

One-on-one business and personal video calls have long become pervasive and represent the most popular segment of video conferencing: 80% of employees indicated one-on-one video conferencing for interviews, project meetings, performance reports, etc. as the most important meeting type. Additionally, 47.6% of American adults indicated their preference to use FaceTime when talking to family and friends during the pandemic, while 44.1% of adults in the US used Facebook Messenger's video capabilities during the COVID-19 lockdowns.

Notwithstanding an explosive growth and broadly accepted benefits of video conferencing, early indicators of several accompanying growth problems and adverse social and human effects have been discovered. In addition to technical issues with video conferencing, such as latency, hardware and software incompatibility, and network instability, a significant portion of users mention such disadvantages of video conferencing as reduced personal contact and understanding, stress and lack of organization. A much-studied adverse effect of video meetings, known as Zoom fatigue, manifests itself through various symptoms. According to expert estimates and polls, the symptoms of Zoom fatigue are experienced, to various degrees, by 38% of video conferencing users, and may include excessive amounts of perceived close-up eye contacts due to the matrix user interface of the participant presence, where multiple participants are simultaneously present on each screen and appear to be constantly gazing at each other. This effect is aggravated by an unnaturally large view field occupied by each participant, compared with a physical meeting. Other symptoms include a constant mirror effect, where participants are seeing themselves through hours of daily video meetings, and lack of mobility during video conferences. A significant increase in the cognitive load during video conferences is due in part to the much lower recognition levels for the critically important non-verbal cues, caused by the conference layout, latency, and other technical and organizational factors.

Accordingly, participants of video conferences are forced to put significantly more efforts to repeating exaggerated non-verbal cues to get noticed, and to spend additional energy to follow the required visual and verbal protocols of video conferences, refrain from unacceptable micro-behaviors, etc.

SUMMARY OF THE INVENTION

Accordingly, it is important to develop techniques and systems for facilitating video communications and mitigating negative effects of video conferencing.

According to the system described herein, providing a video conference for multiple participants includes choosing between at least one physical conference space and at least one virtual conference space, a first one of the participants inviting a second one of the participants to the video conference, the second one of the participants joining the video conference, and conducting the video conference by showing the participants in a same conference space in real time. The conference space may be a physical location of one of the participants or may be a virtual conference space. The participants may switch between the at least one physical conference space and the at least one virtual conference space during the video conference. The participants may use a switch having a first position that sets the conference space to a physical space of the first participant, a second position that sets the conference space to a physical space of the second participant, and a third position that sets the conference space to the at least one virtual conference space. The first one of the participants may invite the second one of the participants by sending a link. At least one of the participants may see the other one of the participants in the conference space and an image of the other one of the participants may be resized and rotated to simulate the participants being together in a physical conference space. At least one of the participants may see the first participant and the second participant interacting in the conference space. Providing a video conference for multiple participants may also include visually exaggerating virtual gestures between the participants. At least one of the participants may alter a visual image of the at least one of the participants. Altering the visual image may include modifying a size of the image, modifying a position of the image, zooming the image in or out, rotating the image, changing a color of the image, changing lighting of the image, and/or changing transparency of the image. Following the at least one of the participants modifying a size of the image, other visual components viewed by the at least one of the participants may be automatically resized. The first participant and the second participant may be presented with a same scene showing the participants interacting in real time during the video conference. The first participant and the second participant may be presented with a different scene of the participants interacting in real time during the video conference. The at least one of the participants may view facial expressions, lip movements, eye expression, and/or smile of the at least one of the participants. The at least one participant may mark a portion of a recording of the video conference to train a machine learning engine to recognize the facial expressions, lip movements, eye expression, and/or smile of the at least one of the participants. The machine learning engine may be trained to detect the facial expressions, lip movements, eye expression, and/or smile of the at least one of the participants. A classifier of the machine learning engine may recognize early signs of undesired behavior by the at least one participant and, in response thereto, may notify the at least one participant about the undesirable behavior and/or provides advice related to the undesirable behavior. A classifier of the machine learning engine may recognizes early signs of undesired behavior by the at least one participant and, in response thereto, may invite the at least one of the participants to actuate an away control that temporarily disables audio and visual inputs from the at least one of the participants and causes an image of the at least one of the participants to be replaced by an indicator that the at least one of the participants is not participating in the video conference. At least one of the participants may actuate an away control that temporarily disables audio and visual inputs from the at least one of the participants and causes an image of the at least one of the participants to be replaced by an indicator that the at least one of the participants is not participating in the video conference.

According further to the system described herein, a non-transitory computer readable medium contains software that provides a video conference for multiple participants. The software includes executable code that facilitates choosing between at least one physical conference space and at least one virtual conference space in connection with a first one of the participants inviting a second one of the participants to the video conference and the second one of the participants joining the video conference and executable code that conducts the video conference by showing the participants in a same conference space in real time. The conference space may be a physical location of one of the participants or may be a virtual conference space. The participants may switch between the at least one physical conference space and the at least one virtual conference space during the video conference. The participants may use a switch having a first position that sets the conference space to a physical space of the first participant, a second position that sets the conference space to a physical space of the second participant, and a third position that sets the conference space to the at least one virtual conference space. The first one of the participants may invite the second one of the participants by sending a link. At least one of the participants may see the other one of the participants in the conference space and an image of the other one of the participants may be resized and rotated to simulate the participants being together in a physical conference space. At least one of the participants may see the first participant and the second participant interacting in the conference space. The software may also include executable code that visually exaggerates virtual gestures between the participants. At least one of the participants may alter a visual image of the at least one of the participants. Altering the visual image may include modifying a size of the image, modifying a position of the image, zooming the image in or out, rotating the image, changing a color of the image, changing lighting of the image, and/or changing transparency of the image. Following the at least one of the participants modifying a size of the image, other visual components viewed by the at least one of the participants may be automatically resized. The first participant and the second participant may be presented with a same scene showing the participants interacting in real time during the video conference. The first participant and the second participant may be presented with a different scene of the participants interacting in real time during the video conference. The at least one of the participants may view facial expressions, lip movements, eye expression, and/or smile of the at least one of the participants. The at least one participant may mark a portion of a recording of the video conference to train a machine learning engine to recognize the facial expressions, lip movements, eye expression, and/or smile of the at least one of the participants. The machine learning engine may be trained to detect the facial expressions, lip movements, eye expression, and/or smile of the at least one of the participants. A classifier of the machine learning engine may recognize early signs of undesired behavior by the at least one participant and, in response thereto, may notify the at least one participant about the undesirable behavior and/or provides advice related to the undesirable behavior. A classifier of the machine learning engine may recognizes early signs of undesired behavior by the at least one participant and, in response thereto, may invite the at least one of the participants to actuate an away control that temporarily disables audio and visual inputs from the at least one of the participants and causes an image of the at least one of the participants to be replaced by an indicator that the at least one of the participants is not participating in the video conference. At least one of the participants may actuate an away control that temporarily disables audio and visual inputs from the at least one of the participants and causes an image of the at least one of the participants to be replaced by an indicator that the at least one of the participants is not participating in the video conference.

The proposed system offers an immersive reflective video chat between two or more participants, where guests are immersed into a real or virtual conference space of a host, may see the host and other participants, and may also see themselves in a reflective mode. Images of participants may be resized and may be seen at similar view angles as in physical meetings. Participants may explore real or virtual conference space of a host and may switch real and virtual conference environments by assuming a role of host and inviting other participants, including the former host, into real or virtual conference spaces of the new host. Participants may communicate in the shared virtual conference space by using exaggerated gestures. Participants may resize all participant images, including their own image when in the reflective mode, on their own screen(s) and may collect examples of their own facial expressions and undesired behaviors in the reflective mode to incrementally train the notification and control component of the system, with may employ facial, gesture and other recognition technologies, to identify early signs of undesired behaviors of a participant. The notification and control component may alert a participant or automatically control the video and/or audio appearance of the participant.

Various aspects of system functioning are explained as follows (explained in connection with a video chat with two participants, also known as host/guest or guest1/guest2).

1. Setting Up and Joining a Video Chat Session

A video chat host chooses a conference space, such as a realistic environment (for example, the house of the host) or a virtual environment (emulated background), within or upon which an image of the host is rendered by a video camera, potentially using a physical or a virtual green screen.

The host initiates a video chat session and sends an invitation (such as a link) to a guest. The guest accepts the invitation (for example, by clicking on the link delivered by a server on behalf of the host, similarly to the co-pilot mode in a product provided by mmhmm inc.) and joins the chat. An image of the guest is super-imposed over the conference space jointly with the image of the host using the video and audio stream produced by a computer (camera and audio system) of the guest.

2. Reflective and Non-Reflective Modes

In contrast with conventional video chat solutions (such as FaceTime or Facebook Messenger), where all participants appear in an individual environment or on top of an individually chosen virtual background, participants of an immersive video chat session are rendered in the same host conference space. Each participant may choose a reflective mode where an image of the participant is present or may choose a non-reflective mode, where each of the participants can only see another participant. Reflective mode allows participants to watch and improve their own video conference behavior and to visually socialize with another participant, as explained below.

3. Conference Space

The original host of an immersive video chat chooses a visual conference space, which may be, for example, a house (physical location) where the host resides during the chat, or a pre-rendered or emulated video, panorama, or background image. The ability to conduct a conference call in a friendly and memorable conference space may generate a favorable psychological environment. During a conference call, a guest may assume the host role at any time and may invite the original host to change the environment of the conference space of the guest, where the guest may physically reside during the talk, or which is an emulated or pre-rendered image.

The feature of altering conference spaces during a video chat session may be implemented through a three-way switch, such as three adjacent buttons A, B, C, permanently visible by the chat participants, where the button A is associated with a physical space (e.g., home) of the host, B — with the a physical space (e.g., home) of the guest, and C— with a virtual pre-rendered/emulated environment (background), which may be chosen by the host, randomly selected from a set of pre-approved backgrounds or may be dynamically generated or selected by the system based, for example, on the video chat progress and the system assessment of a mood of the participants.

4. Automatic Resizing and Individual Size Control for Images of the Participants Rendering of images of the participants may follow the choice of a conference space. Thus, if the switch is in position A, the call is happening in a physical space of the host (e.g., a house of the host). The video captured from the host may be shown full frame, with a real background visible. There may be no position or scaling adjustment possible for the host. The guest may appear as a ghost in the physical space of the host. A video of the guest may be masked with a silhouette mode (possibly via rendering over a physical or virtual green screen) and superimposed onto the video from the physical space of the host. The guest may scale and move a presenter image of the guest (for instance, by pinching and dragging on the touch screen of a mobile device of the guest). Size and location of both participants may be reflected on both screens. If the button B is pressed, the roles of host and guest may be reversed.

For the virtual backgrounds, more size and position controls may be available. To create a more natural visual environment, images of the participants may be automatically resized to appear at a natural angular size in the conference space close to the angular size that would be visible at a physical meeting. Alternatively, each participant may freely resize an image of the other participant and may resize an own image of the participant in a reflective mode. For example, for controlling a participant's own listening or speaking behaviors, a participant may zoom in an own image of the participant, arrange the image conveniently on the screen and scale down the image of the other participant(s) (or allow the system to automatically resize the image of the other participant(s)) to arrange the two images on the screen in an optimal way.

The system may also have a uniform appearance control interface, where a participant may scale only an own size of the participant, transparency, and position, which translates to a screen of the other participant and is visible during a chat session to both participants. Subsequently, participants may jointly (and potentially assisted by the system) control their mutual arrangements.

5. Socializing in the Conference Space

Participants may be able to move their images (avatars) across the conference space, depending on the type of the space. The movements of the participants may be unlimited against a common virtual background or limited within a physical conference space of the current host rendered in the real time by the camera of the host. In the reflective mode, users may bring their images closer, choose a mode when both users can see and control their individual size and position, and perform, for example, social gestures like fist bump or high five that may be recognized by the system and emphasized by displaying exaggerated large gesture icons on the screens.

6. The Away Control

Each video chat participant may have an Away control that temporarily makes the participant invisible to another participant, or makes the participant transparent or miniscule. The Away control may also interrupt an audio stream of the participant and display a visual and possibly a combined video/audio notification, such as "Sorry, will be back shortly" with or without a still avatar image. The Away control may be switched on and off by a button, a gesture or other mechanism.

7. Notifications and Control Component

In addition to the manual Away control, the system may offer notifications and automatic control of visibility of a participant to another participant based on facial, sound, gesture, posture, and other recognition technologies. Such notification and control component may recognize early signs of undesired behavior by a participant (such as a sneezing or yawning urge, changes in facial expression in response to other talk or appearance of another participant, an anxious look away from the screen showing a need for a break, a monotonous speech, etc.). The system may notify the participant about such changes in behavior of the participant, offering specific advice (for example, displaying an individual note "Cheer up!", which may be invisible to the other participant(s)), inviting the participant to manually enable the Away control or automatically enabling a system analog of that control. The efficacy of notifications and control component may depend on learning individual behavior and habits of a participant and implementing the component may use extensive training material, which may be obtained as explained below.

8. Collecting Training Data in the Reflective Mode

Machine Learning for the Notification and control component uses participant specific data on facial expressions, gestures, speech fragments and other behaviors. Training samples for facial, gesture, posture, sound, and speech recognition may be collected by each participant of an immersive video chat in the reflective mode as follows:
  (i) At the beginning of a chat session, a participant may choose the reflective mode and zoom in an image of the participant to make the image more visible.
  (ii) As the video chat session progresses, the participant makes an effort to combine the talk with detecting defects in behavior of the participant. Examples may include undesired facial expressions, gestures, speech, and other reactions when the participant is in a listener role; monotonous speech, repetitions, long pauses, or excessively fast speech when the participant is in a speaker role.
  (iii) The participant may mark each episode of undesired behavior for further review and processing. The participant may similarly mark the questionable episodes of behavior of one or more other participants.
  (iv) After the end of the video chat session, each participant may scan the marked episodes of behavior of each participant (marked by both participants), copy relevant clips of the video chat, replaying behavior of each participant around the marks, categorize and add descriptions to the clips and add the categorizations, descriptions, and clips to the training material for Machine Learning, aimed at improvement of the Notification and control component.

BRIEF DESCRIPTION OF THE DRAWINGS

Embodiments of the system described herein will now be explained in more detail in accordance with the figures of the drawings, which are briefly described as follows.

5 FIG.s 4A-4B are schematic illustrations of socializing in a conference space, according to an embodiment of the system described herein.

Figure 5:
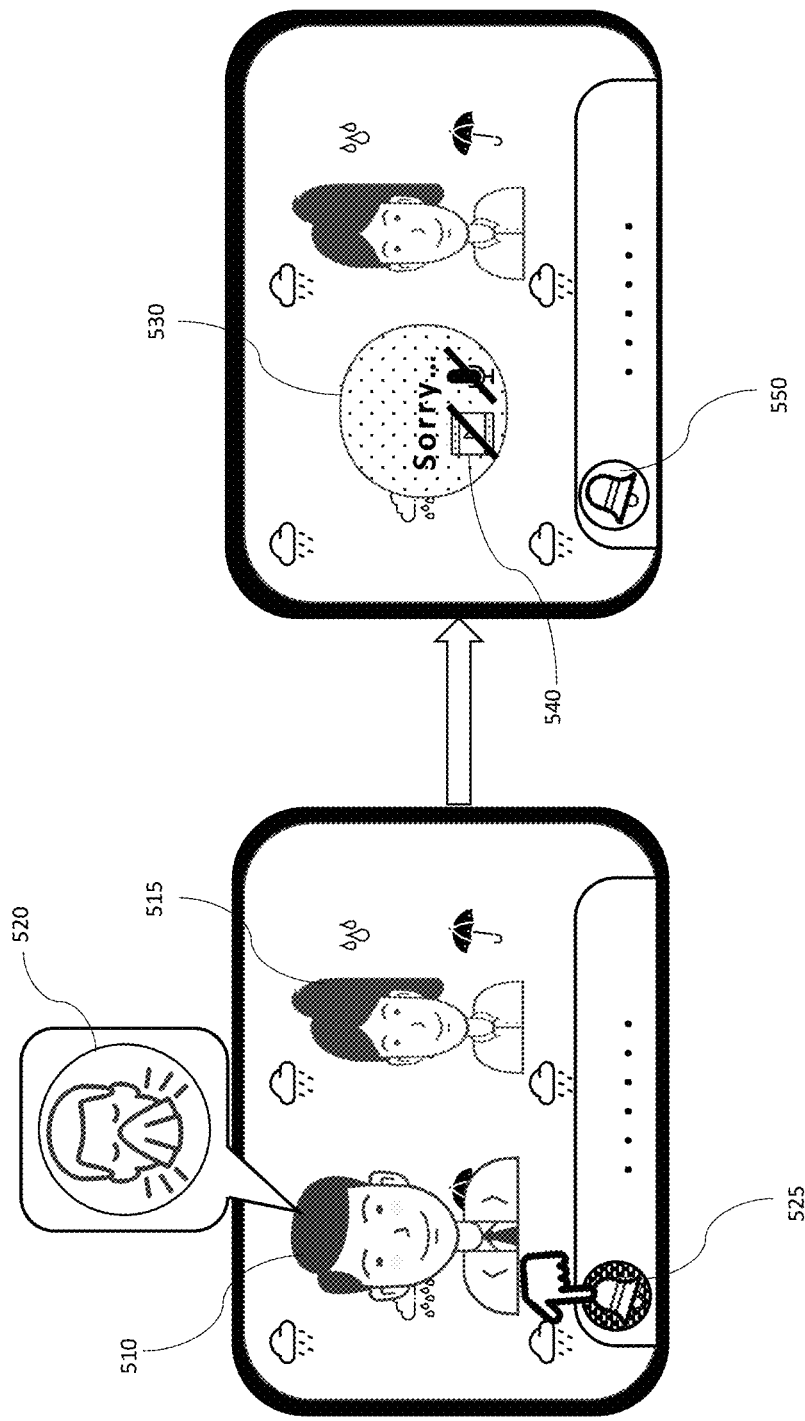

FIG. 5 is a schematic illustration of mitigation of conscious undesired behaviors, according to an embodiment of the system described herein.

Figure 6:
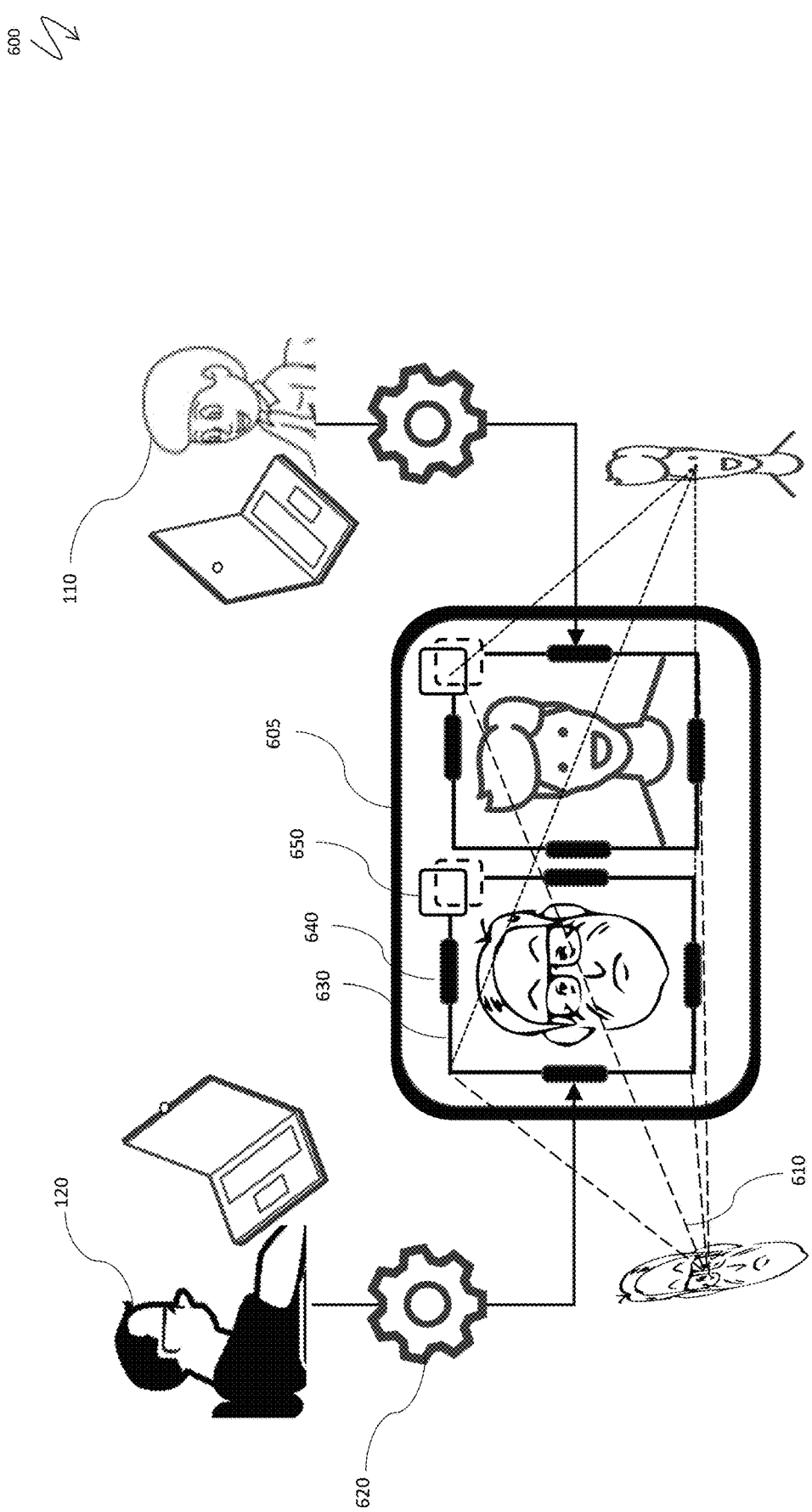

FIG. 6 is a schematic illustration of a uniform user appearance interface, according to an embodiment of the system described herein.

FIG.s 7A-7B are schematic illustrations of a custom user appearance interface in a reflective mode, according to an embodiment of the system described herein.

Figure 8:
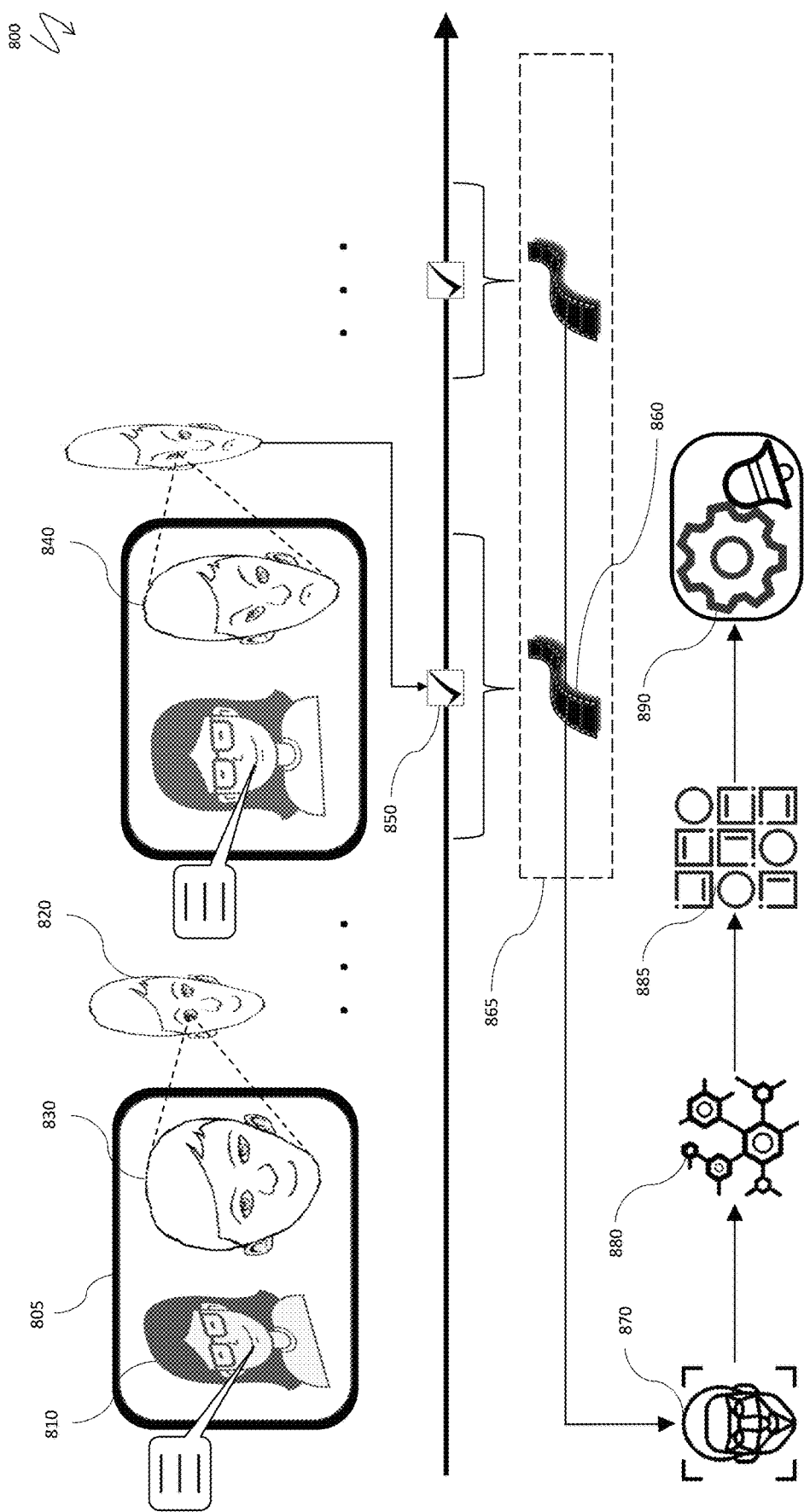

FIG. 8 is a schematic illustration of collecting learning material in a reflective mode and updating a notification component of the system, according to an embodiment of the system described herein.

Figure 9:
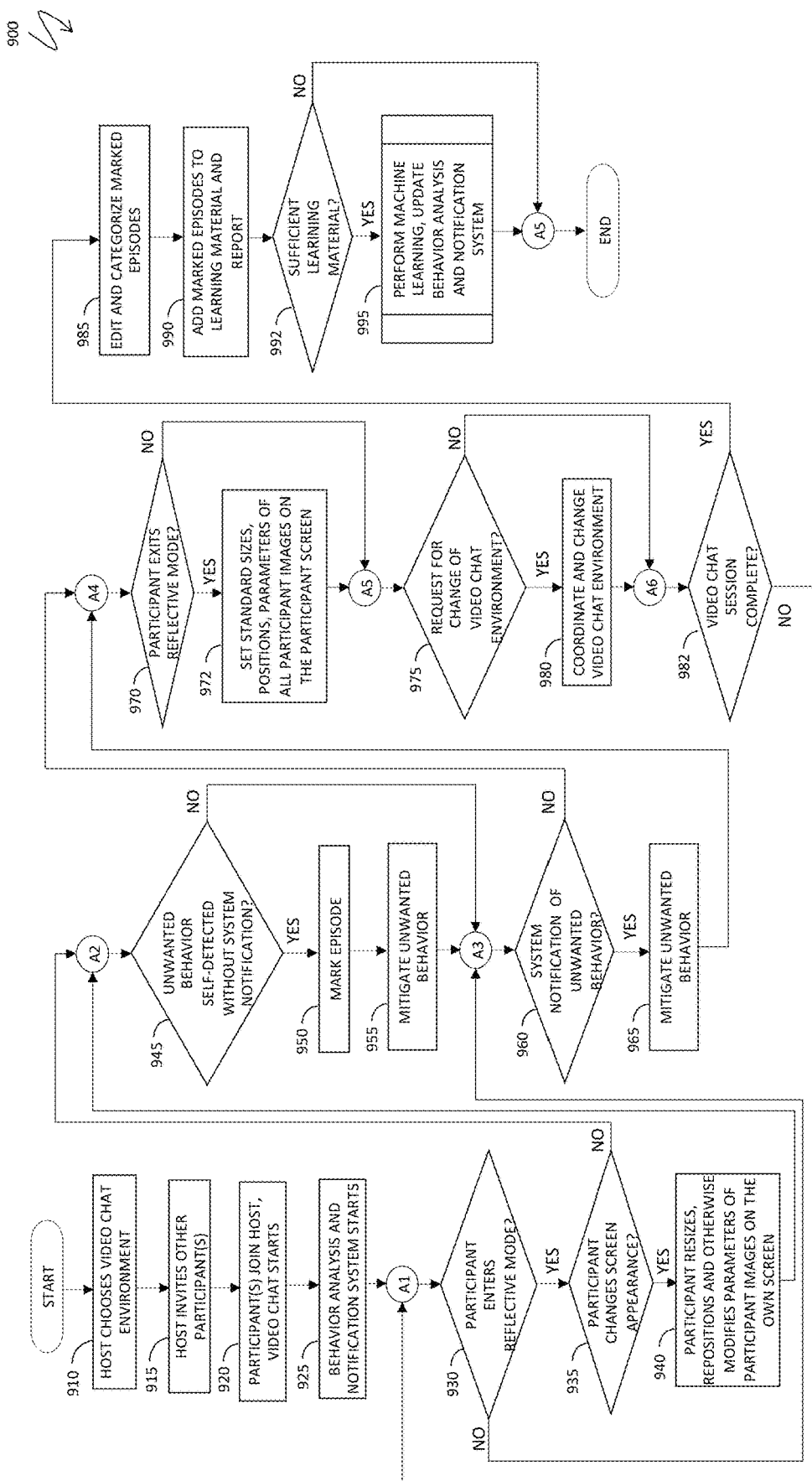

FIG. 9 is a system flow diagram illustrating conducting a session of an immersive and reflective video chat, according to an embodiment of the system described herein.

DETAILED DESCRIPTION OF VARIOUS EMBODIMENTS

The system described herein provides a mechanism, workflow, and features for an immersive reflective video chat between two or more participants, where guests immersed into a real or virtual conference space of a host may see the host and other participants, and may also see themselves in a reflective mode.

Figure 1:
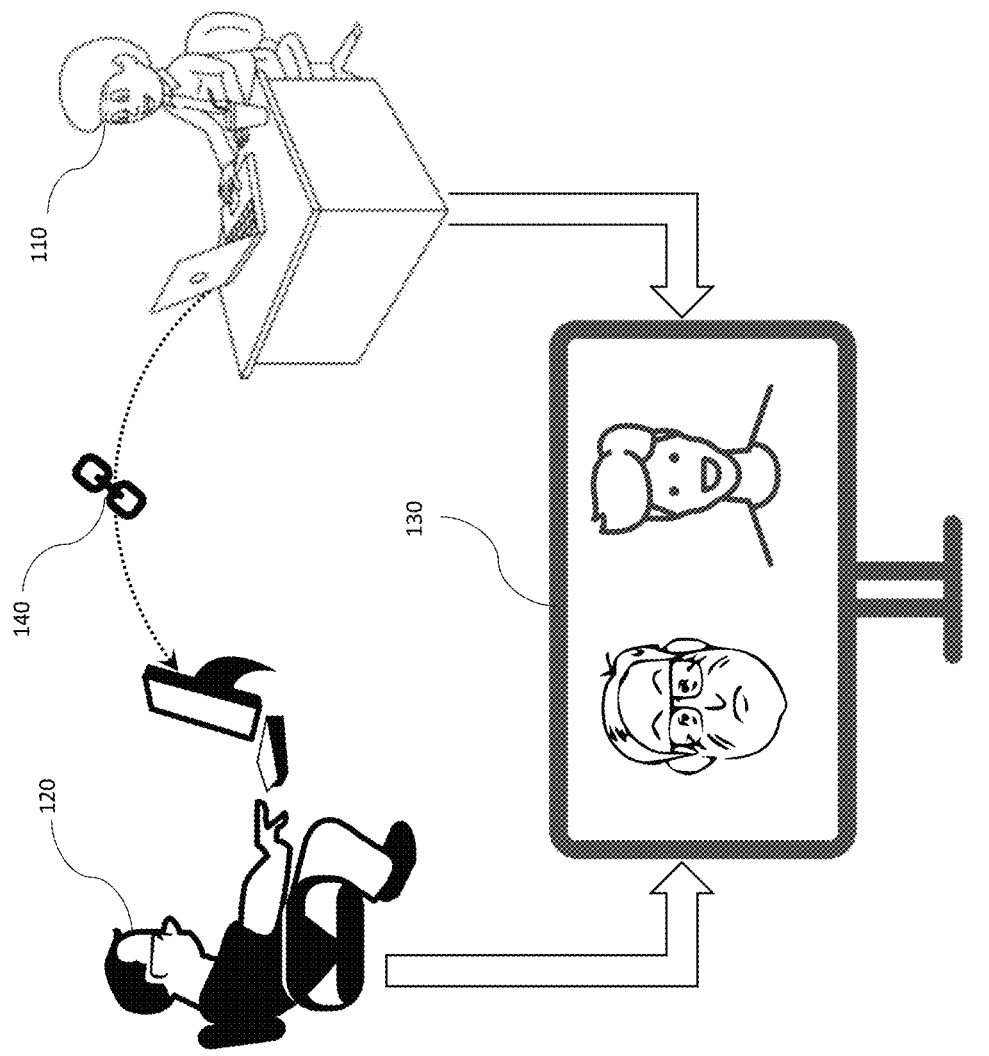
FIG. 1 is a schematic illustration of setting up an immersive and reflective video chat session, according to an embodiment of the system described herein.

FIG. 1 is a schematic illustration 100 of setting up an immersive and reflective video chat session. A host 110 initiates an online immersive reflective video chat session. The system generates a link 140 (i.e., a URL or similar) and transmits the link 140 to a guest 120 who joins the session by, for example, clicking on the link, and both the host 110 and the guest 120 appear in a video chat session 130 immersed in a common conference space.

Figure 2:
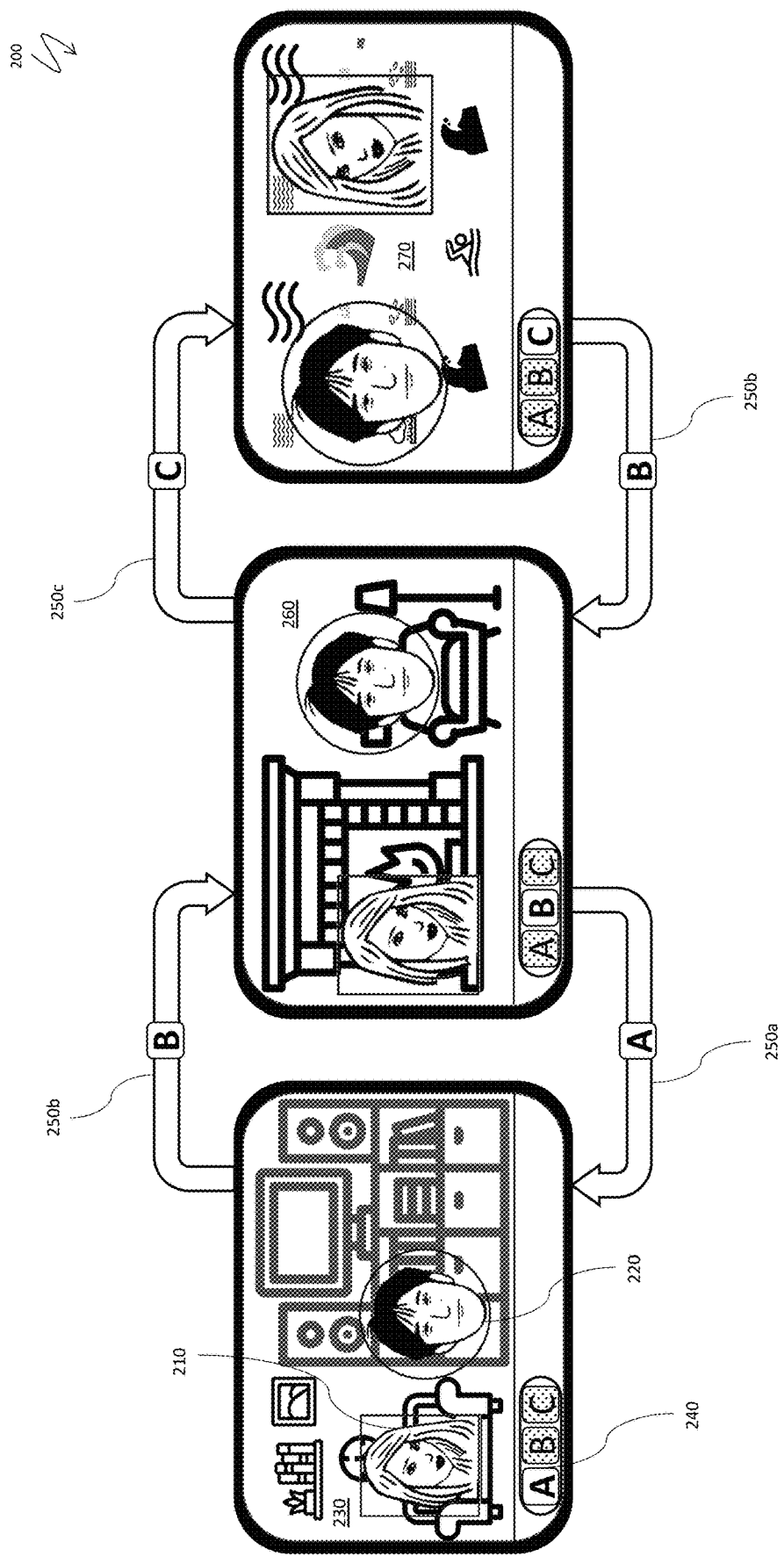
FIG. 2 is a schematic illustration of switching between physical environments and virtual backgrounds, according to an embodiment of the system described herein.

FIG. 2 is a schematic illustration 200 of switching between physical environments and virtual backgrounds. Two conference (video chat) participants 210, 220 are initially immersed into a physical conference space 230 (e.g., a living room) of the participant 210. The conference participants 210, 220 may control the environment they are in using an ABC switch 240. The left screen of the conference space 230, corresponds to a switch position A, which is shown activated (the letter is on the white background). Pressing the B-switch, as shown by an arrow 250b, moves the participants 210, 220 to a conference space 260, the physical space (e.g., house) of the second participant 220, and pressing again the A-switch (shown by an arrow 250a) returns the participants 210, 220 back to the physical conference space 230. In other words, the first two positions of the switch 240 allow the participants 210, 220 to virtually visit each other's physical spaces. There may be, of course, more participants; accordingly, the conference spaces of those who are willing to invite others to their physical space or another location from which they have joined the video chat session, can be represented by switches A, B, C, D, etc. In the illustration 200, a third switch position C corresponds to a virtual conference space 270 with a virtual background; switching to the virtual conference space 270 is shown by an arrow 250c and switching back — by the arrow 250b.

Irrespective of which of the conference spaces 230, 260, 270 is used, the video conference between the participants 210, 220 is conducted in real time so that an image of the participants 210, 220 interacting and immersed in one of the conference spaces 230, 260, 270 is presented to at least one of the participants 210, 220. As explained in more detail elsewhere herein, in some instances, the participants 210, 220 may not see the same image during the video conference. In some instances, each of the participants 210, 220 sees an other one of the participants 210, 220 while in other instances, one or both of the participants 210, 220 see both of the participants 210, 220.

Figure 3:
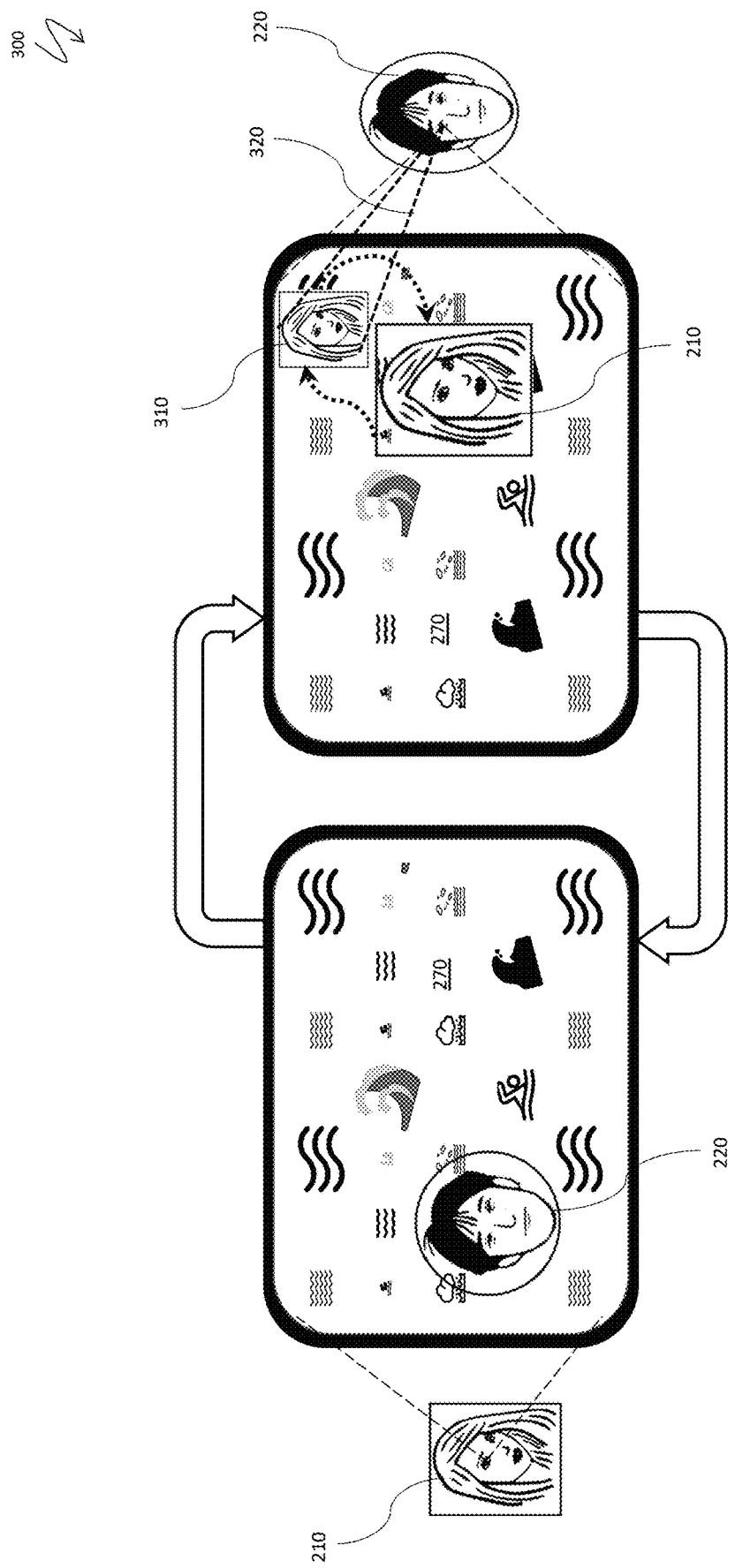
FIG. 3 is a schematic illustration of a non-reflective mode and of automatic resizing, according to an embodiment of the system described herein.

FIG. 3 is a schematic illustration 300 of a non-reflective mode and of automatic resizing. In FIG. 3, each participant sees only other participants. Specifically, the participant 210 sees the participant 220 immersed into a conference space with the virtual background 270, as explained elsewhere herein. Symmetrically, the second participant 220 can see the participant 210 immersed into in the same conference space with the virtual background 270. However, the system has resized (and may also rotate) the image of the first participant 210, as shown by a diagram 310, so that a view angle 320 at which the participant 220 sees the participant 210 resembles angles at which the participants 210, 220 of a physical meeting held in a real conference room, might see each other.

Figure 4B:
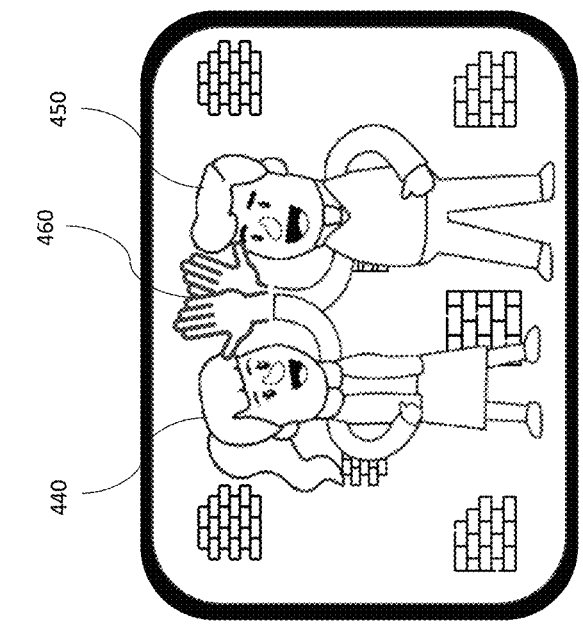
Figure 4A:
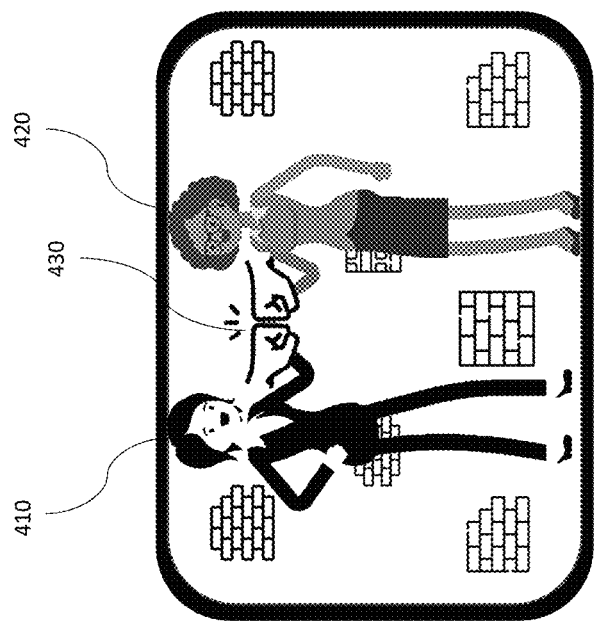

FIG.s 4A-4B are schematic illustrations of socializing in a conference space. In FIG. 4A, two participants 410, 420 of an immersive and reflective video chat session are virtually bumping their fists, which is recognized by the system and displayed as an exaggerated fist bump gesture 430. Analogously, in FIG. 4B, two participants 440, 450 of an immersive and reflective video chat session are moving their hands toward a virtual high five touch, which is recognized by the system and represented via an exaggerated high five gesture 460 with the hands of the participants 430, 440 used for the high five gesture shown as enlarged.

FIG. 5 is a schematic illustration 500 of mitigation of conscious undesired behaviors during immersive video chat sessions. On the left screen with two immersive participants 510, 515, the participant 510 feels a sneezing urge 520 and activates an alarm button 525, which instantly replaces the image of the participant 510 with an away sign 530 and simultaneously disables the audio-video channel for the participant 510, as shown by an item 540. The away state of the participant 510 may last until the participant manually disables an activated alarm button 550 or until a predefined timeout transpires.

FIG. 6 is a schematic illustration 600 of a uniform user appearance interface 620. With the uniform user appearance interface 620, each frame of the immersive and reflective video chat looks the same for both users. Thus, when the host 110 initiates and the guest 120 joins an immersive and reflective video chat session 605, each of the participants 110, 120 is presented with the same scene, as shown in FIG. 6, and further illustrated by a viewing cone 610 for the participant 120.

The uniform user appearance interface 620 provides an editing toolbox 630 for each of the participants 110, 120, allowing the participants 110, 120 to change the size and position of their images within the video chat session 605 (using, for example, a resizing and dragging tool 640), zoom images of the participants 110, 120 in and out (using, for example, a zooming tool 650) and optionally make further changes to images of the participants 110, 120, for example, via 3 D rotation, changing color, lighting and image transparency and other visual effects (not shown in FIG. 3). Each of the participants 110, 120 may change appearance of the participants 110, 120 independently and the participants 110, 120 may coordinate the changes in real time, since all of the participants 110, 120 (there may be more than two) are looking at the same scene.

FIG.s 7A-7B are schematic illustrations of a custom user appearance interface 710 in a reflective mode. In the reflective mode, the participants 110, 120 may change appearance using the same tools as in FIG. 6 but, at any given moment during the chat session, the participants 110, 120 may be presented with different scenes.

Figure 7A:
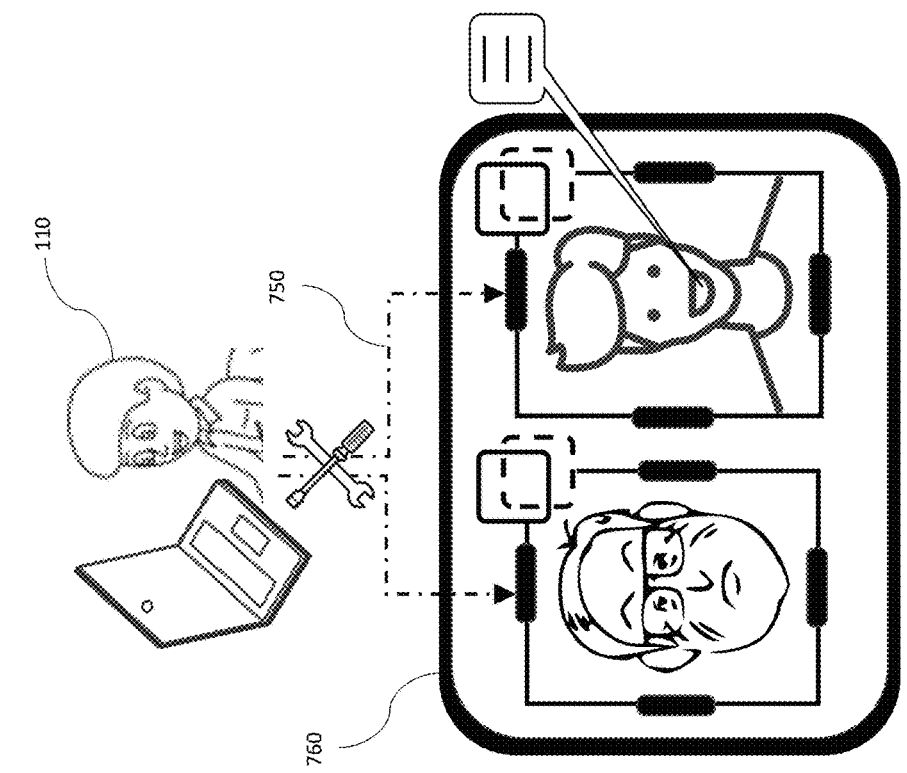
Figure 7A:
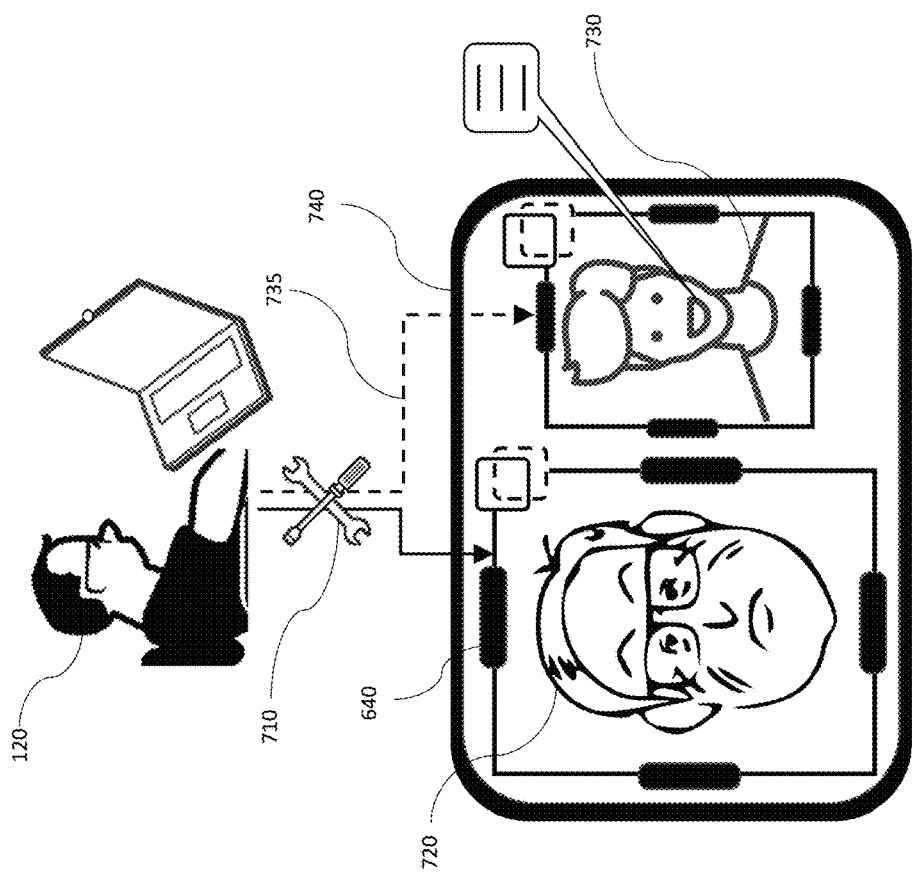

FIG. 7A is a schematic illustration of the custom user appearance interface 710 when one of the participants 110, 120 (in this case, the guest 120, who is a listener) has chosen the reflective mode—for example, with the purpose of watching more closely facial expressions of the guest 120 (himself) at listening time. The chat arrangement is the same as that in FIG.s 1, 6: the host 110 initiates and the guest 120 joins an immersive and reflective video chat session. Subsequently, the guest 120 chooses the custom user appearance interface 710 and enlarges an image 720 of the guest 120 (himself) using the resizing tool 640 (see FIG. 6 for more information). The system may automatically slightly shrink and reposition an image 730 of the host 110 for better spacing and appearance of the scene, as shown by a dashed arrow 735; and a scene layout 740 for the reflective mode of the guest 120 is thus defined.

For the host 110, the scene may look differently; the host 110 may be unaware of the reflective mode of the guest 120 and, assuming the host 110 did not actuate the custom user appearance interface, as indicated by a dash-dotted arrow 750, the scene for the host 110 has a default view 760, as explained elsewhere herein, for example, in FIG. 6.

Figure 7B:
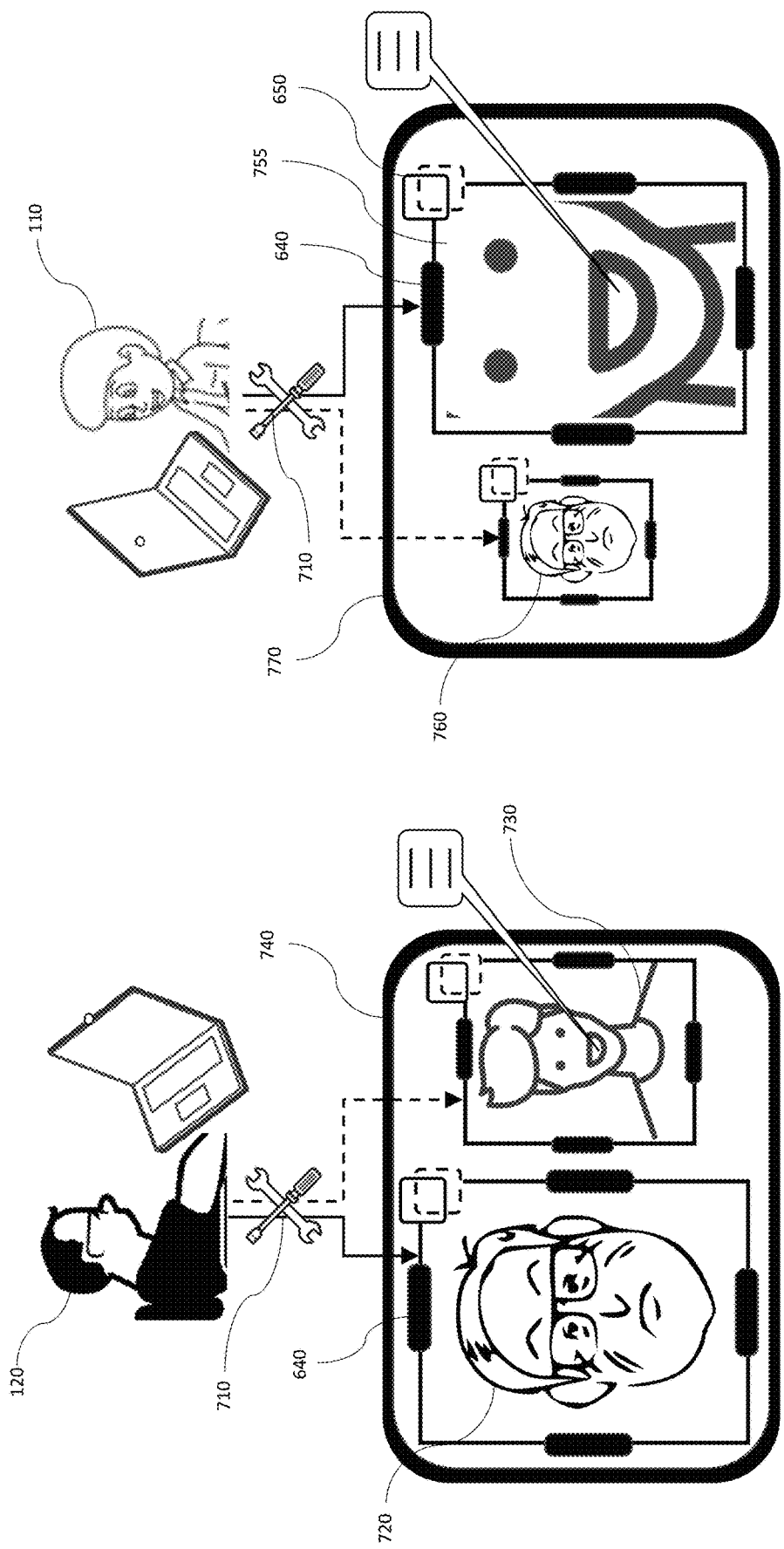

FIG. 7B is a schematic illustration of the custom user appearance interface 710 when both participants, the host 110 and the guest 120, have chosen the reflective mode. A possible reason for the host 110 to choose the reflective mode could be watching lip movements, eye expression, and smile of the host 110 (herself) during a presentation or a regular talk. In FIG.

7B. the layout 740 of the screen of the guest 120 is the same as in the FIG. 7A: the image 720 of the guest 120 is enlarged using the resizing tool 640 after the guest 120 selects the custom user interface option 710. The host 110 changes a screen image 755, upon selecting the custom user interface option 710, by applying the resizing tool 640 and the zoom tool 650. The system may automatically resize and reposition an image 760 of the guest 120 to improve spacing and prevent image overlap, completing a screen layout 770.

FIG. 8 is a schematic illustration 800 of collecting learning material in the reflective mode and updating the notification component of the system. An immersive and reflective video chat session 805 is joined by two participants: a speaker 810 in a non-reflective mode and a listener 820, watching an image 830 of the listener 820 in the reflective mode, paying special attention to undesirable facial expressions and other behaviors, as explained elsewhere herein (see for example, Section 7 of the Summary). The video chat session 805 is continuously recorded. When an undesirable facial expression 840 is noticed by the listener 820, the listener initiates a recording 850, which adds a portion 860 of video recording, including the current frame, as a training sample, to a collection of the reflective training material 865. When a sufficient amount of training material is collected, the system performs a new machine learning step, which may include facial recognition 870 for feature identification, machine learning 880, and building of a new or updated classifier 885, which may be used for the advancement of a notification system 890, as explained in detail elsewhere herein (for example, in Section 7 of the Summary).

Referring to FIG. 9, a system flow diagram 900 illustrates system functioning in connection with asynchronous dynamic development of meeting agendas. Processing begins at a step 910, where the host chooses a video chat environment. After the step 910, processing proceeds to a step 915, where the host invites other participants. After the step 915, processing proceeds to a step 920, where the participant(s) join the host and the video chat session starts. After the step 920, processing proceeds to a step 925, where the behavior analysis and notification system starts, as explained elsewhere herein (see, for example, FIG. 8 and the accompanying text). After the step 925, processing proceeds to a test step 930, where it is determined whether a participant has entered a reflective mode. If so, processing proceeds to a test step 935, where it is determined whether the participant changes their own screen appearance, as explained elsewhere herein (see, for example, FIG.s 7A-7B and the accompanying text). If so, processing proceeds to a step 940, where the participant resizes, repositions, or otherwise modifies parameters of the image of the participant on a screen viewed by the participant. After the step 940, processing proceeds to a test step 945, where it is determined whether any unwanted behavior has been detected by a participant without system notification. Note that the test step 945 may be independently reached from the test step 935 if it is determined that the participant does not change screen appearance. If it is determined at the test step 945 that unwanted behavior is detected, processing proceeds to a step 950, where the participant marks the episode. After the step 950, processing proceeds to a step 955, where the participant mitigates the unwanted behavior (see, for example, FIG. 5 and the associated text for more information). After the step 955, processing proceeds to a test step 960, where it is determined whether a system notification of the unwanted behavior has been delivered to the participant. Note that the test step 960 may be independently reached from the test step 930 if it is determined that the participant did not enter the reflective mode and from the test step 945 if it is determined that unwanted behavior has not been detected by a participant without a system notification. If it is determined at the test step 960 that a system notification of the unwanted behavior has been delivered to the participant, processing proceeds to a step 965, where the unwanted behavior is mitigated. After the step 965, processing proceeds to a test step 970, where it is determined whether the participant has exited the reflective mode. Note that the test step 970 may be independently reached from the test step 960 if it is determined that a system notification of an unwanted behavior has not been delivered. If it is determined at the test step 970 that the participant has exited the reflective mode, processing proceeds to a step 972, where the screen of the participant that has exited the reflective mode is returned to a default view with standard sizes, positions, and parameters of all participant images (see FIG.s 7A-7B for the explanations and examples of screen views). After the step 972, processing proceeds to a test step 975, where it is determined whether a request for change of the video chat environment has been received (such as an activation of a new position of the ABC switch in FIG. 2, causing the change of the chat environment). Note that the test step 975 may be independently reached from the test step 970, if it is determined that the participant did not exit the reflective mode. If it is determined at the test step 975 that a request for change of the video chat environment has been received, processing proceeds to a step 980, where the change of video chat environment is coordinated between participants and made. After the step 980, processing proceeds to a test step 982, where it is determined whether the video chat session is complete. Note that the test step 982 may be independently reached from the test step 975, if it is determined that there is no request for change of the video chat environment. If the video chat session is not complete, processing proceeds from the test step 982 back to the test step 930, described above. Otherwise, if the video chat session is complete, processing proceeds to a step 985, where the system edits and categorizes marked episodes, as explained elsewhere herein (see, for example, FIG. 8 and the accompanying text). After the step 985, processing proceeds to a step 990, where marked episodes are added to learning material and to the system report. After the step 985, processing proceeds to a test step 992, where it is determined whether there is sufficient learning material. If not, processing is complete; otherwise, processing proceeds to a step 995, where machine learning is performed and where behavior analysis and notification system are updated, as explained elsewhere herein.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to servers, desktop computers, notebooks, smartphones, tablets, and other mobile computers. Smartphones and tablets may use operating system(s) selected from the group consisting of: iOS, Android OS, Windows Phone OS, Blackberry OS, and mobile versions of Linux OS. Servers, desktop computers, notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing a video conference for multiple participants, comprising:
   choosing between at least one physical conference space and at least one virtual conference space;
   a first one of the participants inviting a second one of the participants to the video conference;
   the second one of the participants joining the video conference; and
   conducting the video conference by showing the participants in a same conference space in real time, wherein the participants switch between the at least one physical conference space and the at least one virtual conference space during the video conference and wherein the participants use a switch having a first position that sets the conference space to a physical space of the first participant, a second position that sets the conference space to a physical space of the second participant, and a third position that sets the conference space to the at least one virtual conference space.

2. A method, according to claim 1, wherein the first one of the participants invites the second one of the participants by sending a link.

3. A method, according to claim 1, wherein at least one of the participants sees the other one of the participants in the conference space and wherein an image of the other one of the participants is resized and rotated to simulate the participants being together in a physical conference space.

4. A method, according to claim 1, wherein at least one of the participants sees the first participant and the second participant interacting in the conference space.

5. A method of providing a video conference for multiple participants, comprising:
choosing between at least one physical conference space and at least one virtual conference space;
a first one of the participants inviting a second one of the participants to the video conference;
the second one of the participants joining the video conference;
conducting the video conference by showing the participants in a same conference space in real time, wherein at least one of the participants sees the first participant and the second participant interacting in the conference space; and
visually exaggerating virtual gestures between the participants by showing the hands of the participants as enlarged.

6. A method, according to claim 1, wherein at least one of the participants alters a visual image of the at least one of the participants.

7. A method, according to claim 6, wherein altering the visual image includes at least one of: modifying a size of the image, modifying a position of the image, zooming the image in or out, rotating the image, changing a color of the image, changing lighting of the image, or changing transparency of the image.

8. A method, according to claim 7, wherein following the at least one of the participants modifying a size of the image, other visual components viewed by the at least one of the participants are automatically resized.

9. A method, according to claim 8, wherein the first participant and the second participant are presented with a same scene showing the participants interacting in real time during the video conference.

10. A method, according to claim 8, wherein the first participant and the second participant are presented with a different scene of the participants interacting in real time during the video conference.

11. A method, according to claim 10, wherein the at least one of the participants views at least one of: facial expressions, lip movements, eye expression, or smile of the at least one of the participants.

12. A method, according to claim 11, wherein the at least one participant marks a portion of a recording of the video conference to train a machine learning engine to recognize the at least one of: facial expressions, lip movements, eye expression, or smile of the at least one of the participants.

13. A method, according to claim 12, wherein the machine learning engine is trained to detect the at least one of: facial expressions, lip movements, eye expression, or smile of the at least one of the participants.

14. A method, according to claim 13, wherein a classifier of the machine learning engine recognizes early signs of undesired behavior by the at least one participant and, in response thereto, notifies the at least one participant about the undesirable behavior and/or provides advice related to the undesirable behavior.

15. A method, according to claim 13, wherein a classifier of the machine learning engine recognizes early signs of undesired behavior by the at least one participant and, in response thereto, invites the at least one of the participants to actuate an away control that temporarily disables audio and visual inputs from the at least one of the participants and causes an image of the at least one of the participants to be replaced by an indicator that the at least one of the participants is not participating in the video conference.

16. A method, according to claim 1, wherein the at least one of the participants views at least one of: facial expressions, lip movements, eye expression, or smile of the at least one of the participants.

17. A method, according to claim 16, wherein the at least one participant marks a portion of a recording of the video conference to train a machine learning engine to recognize the at least one of: facial expressions, lip movements, eye expression, or smile of the at least one of the participants.

18. A method, according to claim 17, wherein the machine learning engine is trained to detect the at least one of: facial expressions, lip movements, eye expression, or smile of the at least one of the participants.

19. A method, according to claim 18, wherein a classifier of the machine learning engine recognizes early signs of undesired behavior by the at least one participant and, in response thereto, notifies the at least one participant about the undesirable behavior and/or provides advice related to the undesirable behavior.

20. A method of providing a video conference for multiple participants, comprising:
choosing between at least one physical conference space and at least one virtual conference space;
a first one of the participants inviting a second one of the participants to the video conference;
the second one of the participants joining the video conference;
conducting the video conference by showing the participants in a same conference space in real time, wherein the at least one of the participants views at least one of: facial expressions, lip movements, eye expression, or smile of the at least one of the participants and the at least one participant marks a portion of a recording of the video conference to train a machine learning engine to recognize the at least one of: facial expressions, lip movements, eye expression, or smile of the at least one of the participants and wherein the machine learning engine is trained to detect the at least one of: facial expressions, lip movements, eye expression, or smile of the at least one of the participants and wherein a classifier of the machine learning engine recognizes early signs of undesired behavior by the at least one participant and, in response thereto, invites the at least one of the participants to actuate an away control that temporarily disables audio and visual inputs from the at least one of the participants and causes an image of the at least one of the participants to be replaced by an indicator that the at least one of the participants is not participating in the video conference.

21. A method, according to claim 1, wherein at least one of the participants actuates an away control that temporarily disables audio and visual inputs from the at least one of the participants and causes an image of the at least one of the participants to be replaced by an indicator that the at least one of the participants is not participating in the video conference.

22. A non-transitory computer readable medium containing software that provides a video conference for multiple participants, the software comprising:

executable code that facilitates choosing between at least one physical conference space and at least one virtual conference space in connection with a first one of the participants inviting a second one of the participants to the video conference and the second one of the participants joining the video conference; and executable code that conducts the video conference by showing the participants in a same conference space in real time, wherein the participants switch between the at least one physical conference space and the at least one virtual conference space during the video conference and wherein the participants use a switch having a first position that sets the conference space to a physical space of the first participant, a second position that sets the conference space to a physical space of the second participant, and a third position that sets the conference space to the at least one virtual conference space.

* * * * *